United States Patent
Zhao

(10) Patent No.: US 9,241,144 B2
(45) Date of Patent: Jan. 19, 2016

(54) PANORAMA PICTURE SCROLLING

(75) Inventor: Bowen Zhao, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 144 days.

(21) Appl. No.: 13/995,673

(22) PCT Filed: Mar. 21, 2011

(86) PCT No.: PCT/CN2011/000452
§ 371 (c)(1),
(2), (4) Date: Sep. 10, 2013

(87) PCT Pub. No.: WO2012/126136
PCT Pub. Date: Sep. 27, 2012

(65) Prior Publication Data
US 2013/0343733 A1 Dec. 26, 2013

(51) Int. Cl.
| | |
|---|---|
| *H04N 5/262* | (2006.01) |
| *H04N 9/87* | (2006.01) |
| *G09G 5/393* | (2006.01) |
| *G09G 5/34* | (2006.01) |
| *G06T 1/60* | (2006.01) |
| *G09G 5/38* | (2006.01) |
| *G09G 5/39* | (2006.01) |
| *G09G 5/399* | (2006.01) |

(52) U.S. Cl.
CPC .. *H04N 9/87* (2013.01); *G06T 1/60* (2013.01); *G09G 5/346* (2013.01); *G09G 5/393* (2013.01); *G09G 5/38* (2013.01); *G09G 5/39* (2013.01); *G09G 5/399* (2013.01)

(58) Field of Classification Search
CPC ......... G09G 5/393; G09G 5/346; G09G 5/39; G09G 5/399; G09G 5/395; G09G 5/38; G06T 1/60; G06T 3/20
USPC ....................................................... 348/36–39
See application file for complete search history.

(56) References Cited

U.S. PATENT DOCUMENTS

| 7,103,232 B2 * | 9/2006 | Kotake et al. ................. 382/282 |
| 2002/0105525 A1 | 8/2002 | Abler |

(Continued)

FOREIGN PATENT DOCUMENTS

| CN | 101431690 A | 5/2009 |
| EP | 2 058 730 A2 | 5/2009 |

(Continued)

OTHER PUBLICATIONS

Machine generated translation of JP 06-124328 to Matsuki, May 1994.*

(Continued)

*Primary Examiner* — David Harvey
(74) *Attorney, Agent, or Firm* — Jordan IP Law, LLC

(57) ABSTRACT

Systems and methods of displaying panorama images can provide for copying a first portion of a panorama image to a first memory space, and mapping a display to the first memory space. A copy may be initiated of a second portion of the panorama image to a second memory space in response to a scroll view associated with the display transitioning to a predetermined position. In addition, the display may be mapped to the second memory space in response to a transition of the scroll view into an overlap region that is shared by the first and second portions of the panorama image.

16 Claims, 3 Drawing Sheets

(56) References Cited

U.S. PATENT DOCUMENTS

| | | | |
|---|---|---|---|
| 2003/0095125 A1 | 5/2003 | Lim et al. | |
| 2007/0025723 A1* | 2/2007 | Baudisch et al. | G03B 13/02 396/287 |
| 2012/0293559 A1 | 11/2012 | Tomaru et al. | |

FOREIGN PATENT DOCUMENTS

| | | | |
|---|---|---|---|
| JP | 406124328 A * | 5/1994 | |
| JP | 2005-026859 A | 1/2005 | |
| WO | 2008/147561 A2 | 12/2008 | |
| WO | 2012/126136 A1 | 9/2012 | |

OTHER PUBLICATIONS

Extended European Search Report received for European Patent Application No. 11861540.0, mailed on Aug. 18, 2014, 9 pages.

Supplementary European Search Report received for European Patent Application No. 11861540.0, mailed on Sep. 4, 2014, 1 page.

International Preliminary Report on Patentability and Written Opinion received for PCT Patent Application No. PCT/CN2011/000452, mailed on Oct. 3, 2013, 6 pages.

International Search Report and Written Opinion received for PCT application No. PCT/CN2011/000452, mailed on Dec. 22, 2011, 10 Pages.

* cited by examiner

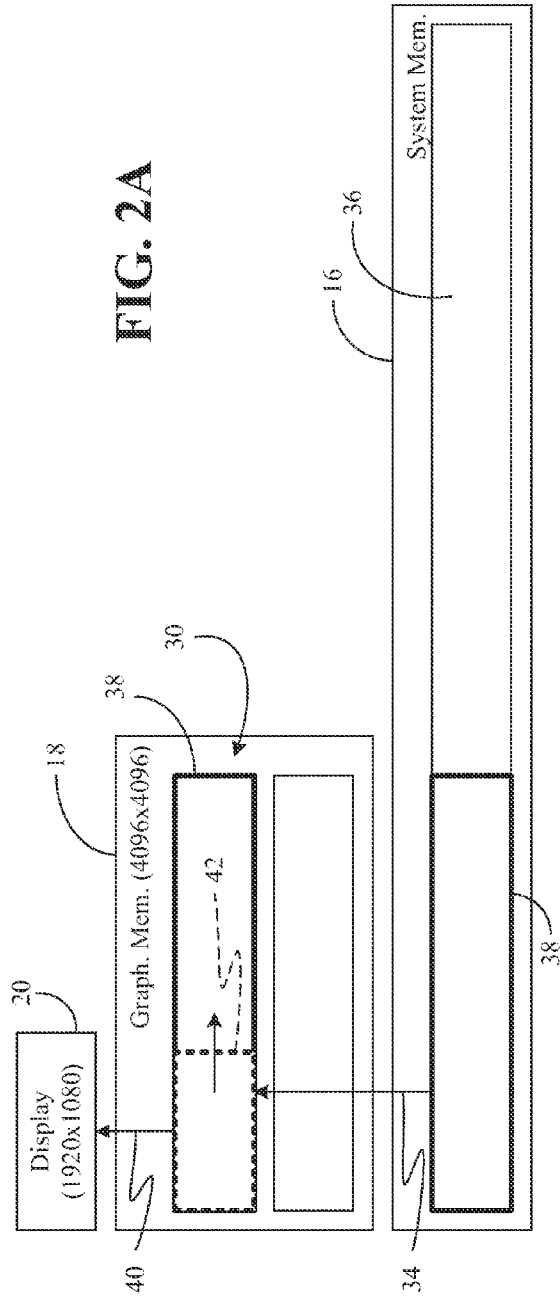
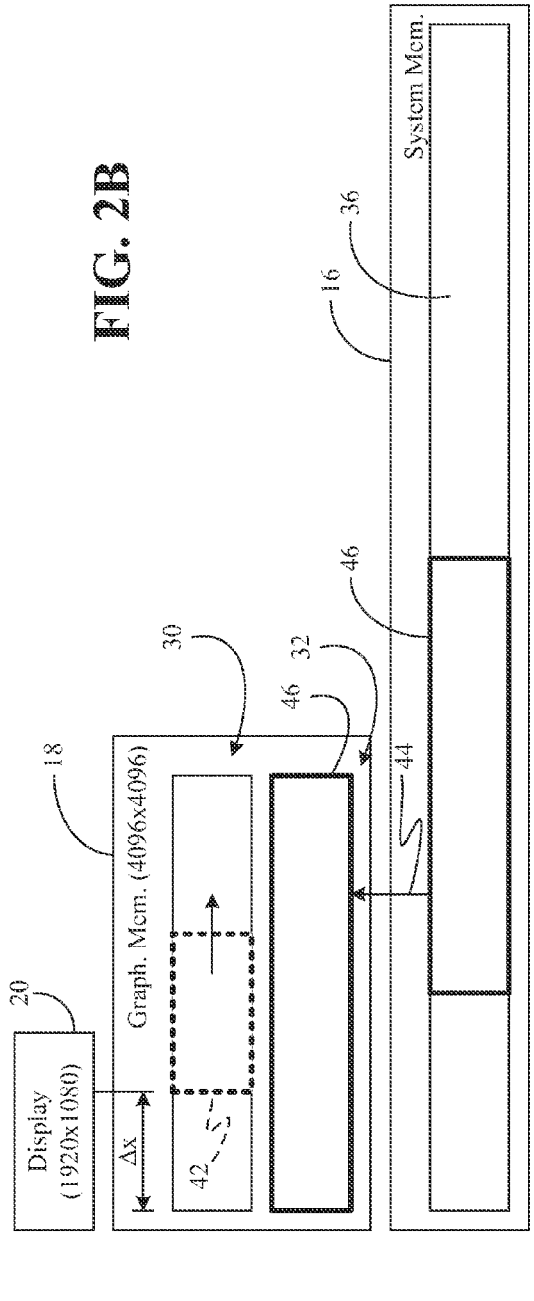

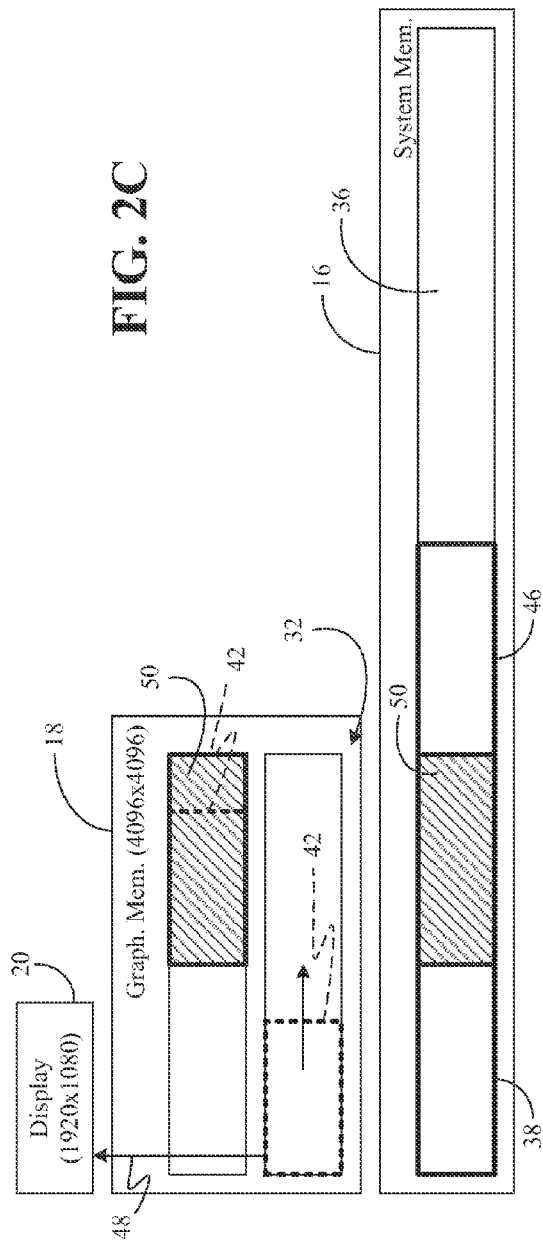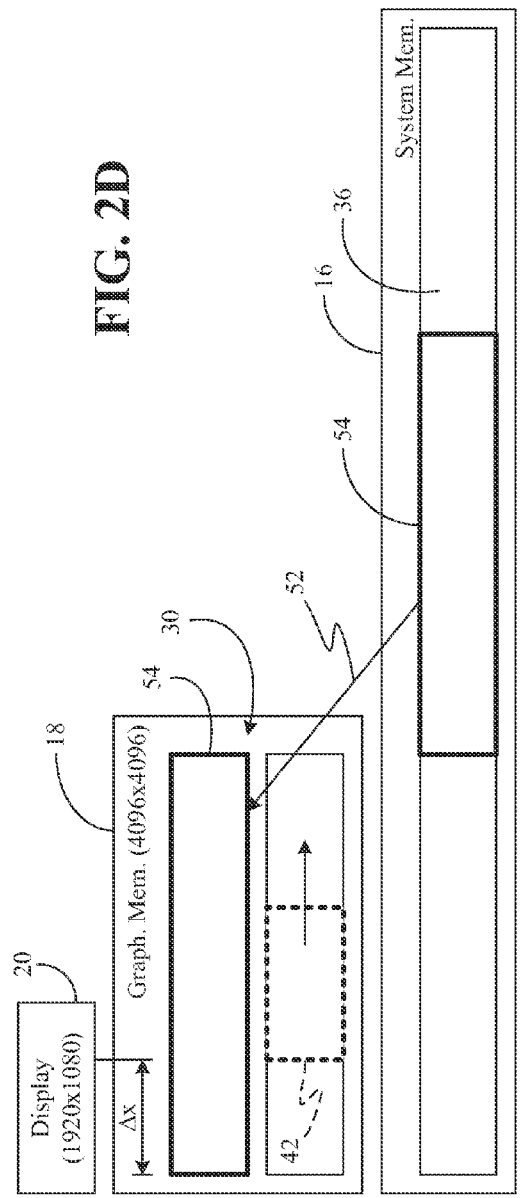

PANORAMA PICTURE SCROLLING

BACKGROUND

Certain digital cameras may support panorama photographing of wide scenes such as landscapes and skylines. Viewing panorama pictures on certain devices, however, can be challenging. For example, using a device such as a conventional set top box to scroll across a panorama picture may result in choppy playback due to limited graphics memory compared with the size of the panorama image.

BRIEF DESCRIPTION OF THE DRAWINGS

The various advantages of the embodiments of the present invention will become apparent to one skilled in the art by reading the following specification and appended claims, and by referencing the following drawings, in which:

FIGS. 2A-2D are block diagrams of an example of a scheme for displaying panorama images according to an embodiment.

DETAILED DESCRIPTION

Embodiments may involve a method in which a first portion of a panorama image is copied to a first memory space, and a display is mapped to the first memory space. The method can also provide for initiating a copy of a second portion of the panorama image to a second memory space in response to a transition of a scroll view associated with the display to a predetermined position.

Embodiments may also include a computer readable storage medium including a set of instructions which, if executed by a processor, cause a computer to copy a first portion of a panorama image to a first memory space, and map a display to the first memory space. The instructions can also cause a computer to initiate a copy of a second portion of the panorama image to a second memory space in response to a transition of a scroll view associated with the display to a predetermined position.

Other embodiments may include a system having a system memory, a graphics memory, a display, and a processor. The processor can have logic to copy a first portion of a panorama image from the system memory to a first memory space in the graphics memory, and map the display to the first memory space. The logic may also initiate a copy of a second portion of the panorama image from the system memory to a second memory space in the graphics memory in response to a transition of a scroll view associated with the display to a predetermined position.

Figure 1:
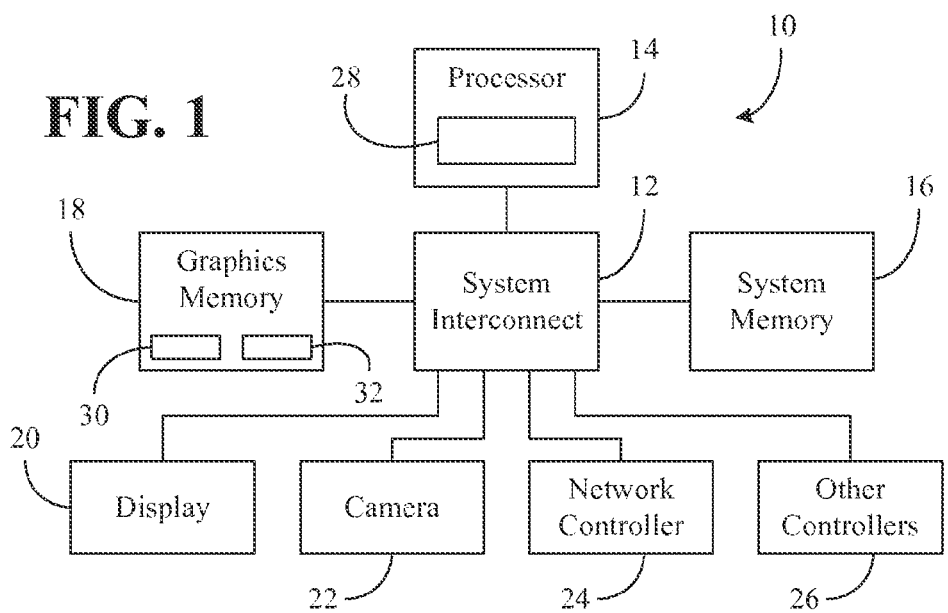
FIG. 1 is a block diagram of an example of a system according to an embodiment.

Turning now to FIG. 1, a system 10 is shown, wherein the system 10 may be used to view panorama images. Thus, the system 10 could he part of a set top box, television, personal computer (PC), server, workstation, laptop, personal digital assistant (PDA), media player, imaging device, mobile Internet device (MID), any smart device such as a smart phone, smart tablet, smart television (TV), etc., or any combination thereof. In the illustrated example, a system interconnect 12 facilitates communication between a number of components including, but not limited to, a processor 14, system memory 16, graphics memory 18, a display 20, a camera 22, a network controller 24, and various other controllers 26. The system interconnect 12 may include a front side bus, other type of bus, a point-to-point fabric that interconnects each of the components in the system 10, and so on. Panorama images may be obtained from the camera 22 or other off-platform source in the form of RGB (red/green/blue) raw data or other image data, and viewed on the display 20. Generally, the display 20 could have a width (e.g., 1920×1080 pixels) that is substantially less (e.g., order of magnitude) than the width of a panorama image to be viewed on the display. Accordingly, the panorama image might be scrolled across the display 20 in response to a scroll request from a user (e.g., left or right remote control button press) or other scroll initiation mechanism.

In addition, the graphics memory 18, which may be used by the display 20 during image playback, could also be much smaller (e.g., capacity of 4096×4096 pixels) than the panorama image. The processor 14 may therefore include logic 28 to copy a first portion of the panorama image from the system memory 16 to a first memory space 30 in the graphics memory 18, and map the display 20 to the first memory space 30. Mapping the display 20 to the first memory space 30 may cause the display 20 to playback the panorama image from the first memory space 30. For example, a controller (not shown) of the display 20 may use a driver, API (application program interface), and/or embedded hardware to "flip" image data from the first memory space 30 to the screen of the display 20. The logic 28 can also initiate a copy of a second portion of the panorama image from the system memory 16 to a second memory space 32 in the graphics memory 18 in response to a transition of a scroll view associated with the display to a predetermined position. As will be discussed in greater detail, the predetermined position could be defined as a certain percentage (e.g., sixty-seven percent) of the width of the display 20 relative to an edge of the first portion of the panorama image. Thus, when the scroll view reaches the predetermined position, the copy of the second portion may begin.

Moreover, the logic 28 may define a width of an overlap region of the panorama image, wherein the overlap region is shared by the first and second portions of the panorama image. The logic can also map the display 20 to the second memory space 20 in response to a transition of the scroll view of the display 20 entirely into the overlap region, wherein mapping the display 20 to the second memory space 32 can cause the display 20 to playback the panorama image from the second memory space 32 (e.g., via display controller driver, API, hardware, etc.). Accordingly, the illustrated logic 28 causes the display 20 to switch memory spaces while the displayed portion of the panorama image is in the overlap region. Such an approach can substantially reduce and/or eliminate jitter/choppiness in the playback of the panorama image and facilitate high quality image scrolling.

The display 20 could include a wide variety of visual output devices such as a television screen (e.g., liquid crystal display/LCD, light emitting diode/LED, plasma, etc.), computer monitor, touch screen, projector, and so on. In addition, the processor 14 may also have one or more cores (not shown), where each core may be fully functional with instruction fetch units, instruction decoders, caches, execution units, and so on. The system memory 16 could include double data rate (DDR) synchronous dynamic random access memory (SDRAM, e.g., DDR3 SDRAM JEDEC Standard JESD79-3C, April 2008) modules, or other types of modules. The modules of the system memory 16 may be incorporated into a single inline memory module (SIMM), dual inline memory module (DIMM), small outline DIMM (SODIMM), and so on.

The graphics memory 18 could include GDDR (graphics DDR), DDR SDRAM modules, or any other memory technology suitable for supporting graphics rendering. The graphics memory 18 might be installed on a graphics/video card, wherein the system interconnect 12 may also include a graphics bus such as a PCI Express Graphics (PEG, e.g., Peripheral Components Interconnect/PCI Express x16 Graphics 150W-ATX Specification 1.0, PCI Special Interest Group) bus, or Accelerated Graphics Port (e.g., AGP V3.0 Interface Specification, September 2002) bus. The graphics card may be integrated onto the system motherboard, into the processor 14 die, configured as a discrete card on the motherboard, etc.

The network controller 24 could support the transfer of panorama images to and from the system 10, and might provide off-platform communication functionality for a wide variety of purposes such as cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1.-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RE) telephony purposes. The network controller 24 might also use a wired data connection (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 2.0 Specification), digital subscriber line (DSL), cable modem. T1 connection), etc., to enable access to additional off-platform resources.

The other controllers 26, may include controllers such as USB (Universal Serial Bus, e.g., USB Specification 2.0, USB Implementers Forum), Serial ATA (SATA, e.g., SATA Rev, 3.0 Specification, May 27, 2009, SATA International Organization/SATA-IO), High Definition Audio, and other controllers. The other controllers 26 could also provide support for user interface devices such as a keypad, mouse, microphone, speaker, etc. in order to allow a user to further interact with and perceive information from the system 10. Other system configurations may also be used.

FIGS. 2A-2D show a unique scheme of scrolling a panorama image 36 across a display such as the display 20. In particular, FIG. 2A demonstrates that a copy 34 may be conducted of a first portion 38 of the panorama image 36 from the system memory 16 to a first memory space 30 in the graphics memory 18. The copy 34 could be conducted in response to a scroll request such as a left or right remote control button press by a user (or other scroll initiation mechanism), a request to display the panorama image 36 on the display 20, and so on. The illustrated display 20 is then mapped 40 to the first memory space 30, which causes a scroll view 42 associated with the display 20 to transition across the first portion 38 of the panorama image 36 stored in the first memory space 30.

FIG. 2B demonstrates that a copy 44 can be initiated of a second portion 46 of the panorama image 36 from the system memory 16 to a second memory space 32 in the graphics memory 18 in response to a transition of the scroll view 42 of the display 20 to a predetermined position (e.g., $\Delta x$). The predetermined position may be selected so that the copy 44 will be complete by the time the second portion 46 is needed by the display 20. For example, an instruction may be created to initiate the copy 44 when the leftmost edge of the scroll view 42 reaches sixty-seven percent (e.g., $\frac{2}{3}$) of the width of the display 20. A similar position could be established for the rightmost edge of the scroll view 42 in the case of right-to-left scrolling.

FIG. 2C demonstrates that the display 20 may be mapped 48 to the second memory space 32 in response to a transition of the scroll view 42 entirely into an overlap region 50 that is shared by both the first portion 38 and the second portion 46 of the panorama image 36. In one example, the overlap region 50 is wider than the display 20 and has a width that is defined based on the scroll speed of the display 20. For example, if the display 20 scrolls at a rate of five pixels per scroll unit (i.e., pixel one is replace by pixel six, pixel two is replaced by pixel seven, etc., when scrolling left-to-right), the scroll view 42 could transition five pixels into the overlap region 50 before the memory space switch is triggered. Accordingly, the width of the overlap region 50 could be set at a value greater than the width of the display 20 based on the scroll speed (e.g., 2048 pixels) in order to provide a buffer.

FIG. 2D demonstrates that a copy 52 can be initiated of a third portion 54 of the panorama image 36 from the system memory 16 to the first memory space 30 in the graphics memory 18 in response to a transition of the scroll view 42 of the display 20 to the predetermined position (e.g., $\Delta x$). As already noted, the predetermined position may be selected so that the copy 52 will be complete by the third portion 54 is needed by the display 20. The illustrated scheme may be repeated as the scroll view 42 transitions across the panorama image 36 in either direction.

Figure 3:
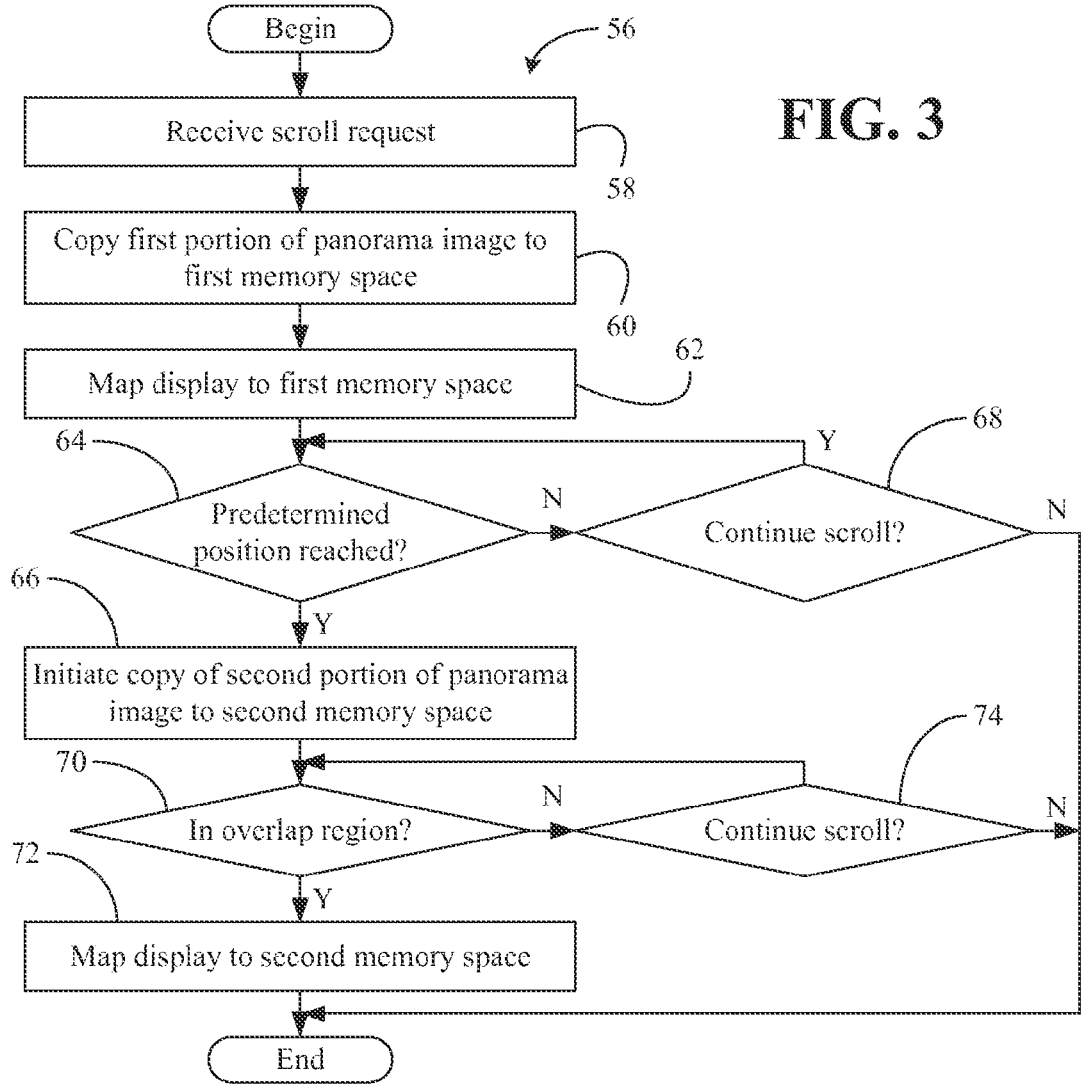
FIG. 3 is a flowchart of an example of a method of displaying panorama images according to an embodiment.

FIG. 3 shows a method 56 of displaying panorama images. The method 56 may be implemented in executable software as a set of logic instructions stored in a machine- or computer-readable medium of a memory such as random access memory (RAM), read only memory (ROM), programmable ROM (PROM), firmware, flash memory, etc., in fixed-functionality hardware using assembly language programming and circuit technology such as application specific integrated circuit (ASIC), complementary metal oxide semiconductor (CMOS) or transistor-transistor logic (TTL) technology, or any combination thereof. For example, computer program code to carry out operations shown in method 56 may be written in any combination of one or more programming languages, including an object oriented programming language such as Java, Smalltalk, C++ or the like and conventional procedural programming languages, such as the "C" programming language or similar programming languages.

Processing block 58 provides for receiving a scroll request. As already noted, the scroll request could be a user request to display and/or scroll a panorama image on a display having a width that is substantially less than the width of the panorama image. Illustrated block 60 conducts a copy of a first portion of the panorama image to a first memory space, and illustrated block 62 maps a display to the first memory space. If it is determined at block 64 that a scroll view associated with the display has transitioned to a predetermined position, a copy may be initiated at block 66 of a second portion of the panorama image to a second memory space. If it is determined at block 64 that the scroll view has not transitioned to the predetermined position, a determination is made at illustrated block 68 as to whether the panorama image is still being scrolled in the original direction. If the panorama image is still being scrolled in the original direction, the determination at block 64 may be repeated.

Once the scroll view transitions to the predetermined position, illustrated block 70 determines whether the scroll view has transitioned entirely (e.g., left edge in left-to-right scroll, or right edge in right-to-left scroll) into an overlap region that is shared by the first and second portions of the panorama image. If so, the display may be mapped to the second memory space at block 72. If the left edge (on a left-to-right scroll) of the scroll view has not reached the overlap region, another determination may be made at block 74 as to whether the panorama image is still being scrolled in the original direction. If the panorama image is still being scrolled in the original direction, the determination at block 70 may be repeated.

The techniques described herein can therefore be used for scrolling operations in either direction, as well as for changes in direction, and may substantially improve scrolling performance. Moreover, the memory spaces described herein could be contiguous or distributed, and may apply to a wide variety of memory structures.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. in addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A system comprising:
a system memory;
a graphics memory;
a display; and
a processor including logic to,
copy a first portion of a panorama image from the system memory to a first memory space in the graphics memory,
map the display to the first memory space,
initiate a copy of a second portion of the panorama image from the system memory to a second memory space in the graphics memory in response to a transition of a scroll view associated with the display to a predetermined position, and
define a width of an overlap region of the panorama image based on a scroll speed of the display, wherein the overlap region is to be shared by the first and second portions of the panorama image.

2. The system of claim 1, wherein the logic is to,
map the display to the second memory space in response to a transition of the scroll view entirely into the overlap region, wherein the width of the overlap region is to be greater than a width of the display.

3. The system of claim 2, wherein the logic is to initiate a copy of a third portion of the panorama image from the system memory to the first memory space in response to a transition of the scroll view to the predetermined position, wherein the predetermined position is to be a percentage of the width of the display.

4. The system of claim 1, wherein the copy of the first portion is to be conducted in response to a scroll request.

5. A method comprising:
copying a first portion of panorama image to a first memory space;
mapping a display to the first memory space;
initiating a copy of a second portion of the panorama image to a second memory space in response to a transition of a scroll view associated with the display to a predetermined position; and
mapping the display to the second memory space in response to a transition of the scroll view entirely into an overlap region of the panorama image, wherein the overlap region is shared by the first and second portions of the panorama image, and wherein the overlap region has a width that is greater than a width of the display.

6. The method of claim 5, further including defining the width of the overlap region based on a scroll speed of the display.

7. The method of claim 5, further including initiating a copy of a third portion of the panorama image to the first memory space in response to a transition of the scroll view to the predetermined position.

8. The method of claim 5, wherein the predetermined position is a percentage of a width of the display.

9. The method of claim 5, wherein the panorama image has a width that is greater than a width of the display.

10. The method of claim 5, wherein the copy of the first portion is conducted in response to a scroll request.

11. A non-transitory computer readable storage medium comprising a set of instructions which, if executed by a processor, cause a computer to:
copy a first portion of a panorama image to a first memory space;
map a display to the first memory space;
initiate a copy of a second portion of the panorama image to a second memory space in response to a transition of a scroll view associated with the display to a predetermined position; and
map the display to the second memory space in response to a transition of the scroll view entirely into an overlap region of the panorama image, wherein the overlap region is shared by the first and second portions of the panorama image, and wherein the overlap region is to have a width that is greater than a width of the display.

12. The medium of claim 11, wherein the instructions, if executed, cause a computer to define the width of the overlap region based on a scroll speed of the display.

13. The medium of claim 11, wherein the instructions, if executed, cause a computer to initiate a copy of a third portion of the panorama image to the first memory space in response to a transition of the scroll view to the predetermined position.

14. The medium of claim 11, wherein the first predetermined position is to be a percentage of a width of the display.

15. The medium of claim 11, wherein the panorama image is to have a width that is greater than a width of the display.

16. The medium of claim 11, wherein the copy of the first portion is to be conducted in response to a scroll request.

* * * * *